United States Patent [19]

Givens

[11] Patent Number: 4,582,739

[45] Date of Patent: Apr. 15, 1986

[54] EDGE AND CORNER PROTECTIVE BUMPER

[76] Inventor: Rosemarie Givens, 44 Joseph St., Bristol, Conn. 06010

[21] Appl. No.: 581,261

[22] Filed: Feb. 17, 1984

[51] Int. Cl.$^4$ .................. A47B 97/00; A47D 15/00
[52] U.S. Cl. .................................. 428/83; 52/783; 248/345.1; 428/122
[58] Field of Search ............... 49/488, 490; 52/783; 248/345.1; 428/53, 122, 81, 83, 31

[56] References Cited

U.S. PATENT DOCUMENTS

| | | | |
|---|---|---|---|
| 2,388,297 | 11/1945 | Slaughter | 428/53 |
| 2,851,744 | 9/1958 | Oehmig | 49/490 X |
| 3,233,644 | 2/1966 | Bono | 428/122 X |
| 3,298,374 | 1/1967 | Grundell | 428/122 X |
| 3,523,710 | 8/1970 | Barecki et al. | 428/81 X |
| 3,580,469 | 5/1971 | Reese | 206/521 |
| 3,722,700 | 3/1973 | Cummings | 248/345.1 X |
| 3,869,106 | 3/1975 | Gregov | 248/345.1 |
| 4,117,782 | 10/1978 | Cahill | 248/345.1 X |
| 4,153,230 | 5/1979 | Giacin | 428/11 X |

*Primary Examiner*—Henry F. Epstein

[57] ABSTRACT

A removable protective impact bumper that encloses the edges and corners of furniture to, in part, prevent injuries to children that may result from falling against the edges or corners. The bumper is intended to be reusable and to be installed and removed without damage to furniture. The bumper includes a double slotted, elongated, extruded cushion made of a flexible, resilient, nontoxic, fire retardant foam plastic material such as polyurethane, in various colors and patterns such as woodgrain to compliment home decor. To tightly secure the bumper to furniture, three reusable adhesive strips of a type that will not be damaging to furniture extend along the face surfaces of a groove, with a release paper to protect adhesive prior to use. A belt with a fastener runs along the inside surface of an outer groove and is tightly secured around such furniture. The bumper can be cut to fit any size table with the ends thereof in end abutting relation. The outer slot closes under compression and thus completely conceals the belt and fastener. If the bumper is to be used on furniture where the complete perimeter of the furniture is not accessible, such as counters, the belt may be eliminated.

11 Claims, 9 Drawing Figures

EDGE AND CORNER PROTECTIVE BUMPER

BACKGROUND OF THE INVENTION

Field of the Invention

This invention relates generally to protective cushions and more particularly to protecting users and occupants from injuries caused by hitting against the edges of furniture and the like as well as to protect the edges of furniture and the like from damage either during moving or due to the impact from cleaning equipment, workman's tools and other objects.

Discussion of Prior Art

Heretofore protective bumpers consisted of two basic types. The first being the "trim" type such as that shown in U.S. Pat. No. 3,869,106 Gregov issued Mar. 4, 1975 which discloses a resilient trim type of edge guard that covers only one corner of edge surface and is applicable by adhesive and U.S. Pat. No. 3,722,700 Cummings issued Mar. 27, 1973 which discloses a trim type "C" shaped elastomeric corner pad for use on food service carts. The first type also includes apparatus such as that shown in U.S. Pat. No. 3,580,469 Reese issued May 25, 1971. The second basic type of furniture guards consisted of gas containing inflated tubular members such as that shown in U.S. Pat. No. 4,117,782 Cahill which comprises inflated elongated members for wrapping around furnishings and several disclosures for use of such inflatable guards in vehicles. It is believed that none of the prior art combined cushioning top and bottom edges by encompassing the entire thickness of a furniture element with a non-inflated resilient cushion and a dual means of securing the cushion in a manner which is safe and secure to an article of furniture or the like.

In general, the prior art structures have not been very positively secured to articles of furniture. This has presented a danger to toddlers who may have grasped the bumper structure to raise themselves from the floor and this may have resulted in the bumper detaching from the associated furniture. This situation has been most likely where the prior art used only a single means of attachment. A bumper that falls off is doubly dangerous since it may result in a toddler falling and then striking a sharp unprotected surface.

This invention's principle object is to provide a more effective means of protecting children from injuries sustained by falling into and striking sharp furniture edges and corners.

It is another object of the invention to provide apparatus which cannot deflate as previous inflatable apparatus and thus to avoid a loss of utility.

It is another object of the invention to provide apparatus which envelopes the entire thickness of furniture elements and thus provides protection with respect to every sharp edge corner, that is, both top or bottom.

It is another object of the invention to provide apparatus which will function when toddlers hold onto table edges to lift themselves off the floor, and, more particularly, is secured to table edges by two means of attachment and thus cannot easily pull away from table edges.

Another object of the invention is to provide a bumper that may be used on countertops or furniture that does not have edges extending around the entire peripheral surface and thus would not enable the bumper ends to meet in end abutting relation.

Still another object of the invention is to provide a bumper which fits various furniture edge thicknesses, is reusable and has an adhesive coating which will not damage furniture.

Yet another object is to provide apparatus which can be produced in various furniture shades and colors to compliment the attractive appearance of furniture.

It is still another object of the invention to provide apparatus which is easily produced using conventional and readily available materials, processes, and processing equipment. Further objects and advantages of this invention will become more readily apparent from consideration of the following description, including the drawings, in which like parts refer to like reference numerals.

SUMMARY OF THE INVENTION

It has not been found that these and other objects may be attained in a bumper for use on furniture and the like in which a protective furniture edge guard apparatus comprises an elongated flexible bumper having a generally cylindrical section contour with opposed first and second axially extending slots defined therein. The first and second slots are each defined by opposed first and second axially extending lips. The first slot is dimensioned and configured for engagement with an associated article of furniture. The second slot is dimensioned and configured for cooperation with an associated belt. The bumper includes means responsive to tightening of the associated belt for closing the second slot with the lips thereof in substantially abutting relationship.

BRIEF DESCRIPTION OF THE DRAWING

The invention will be better understood by reference to the accompanying drawing in which.

DESCRIPTION OF THE PREFERRED EMBODIMENT

Figure 1:
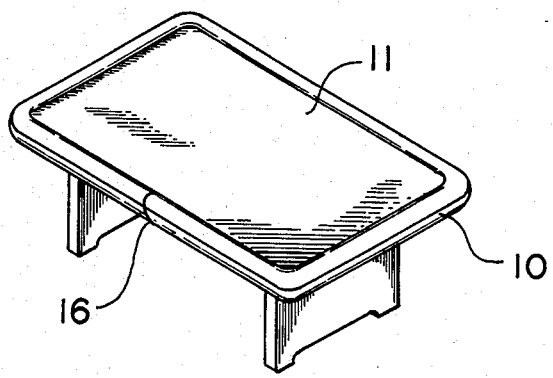
FIG. 1 is an isometric view of the bumper in use on a coffee table.
Figure 2:
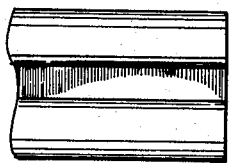
FIG. 2 is a side elevational view of the bumper in the uncompressed state.
Figure 3:
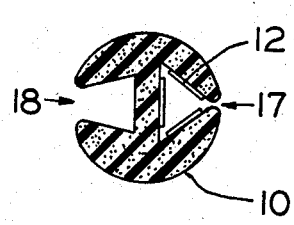
FIG. 3 is a sectional view of the bumper in the uncompressed state.

Referring now to FIGS. 2 and 3 there is shown an elongated bumper 10. This view illustrates the simplicity of the extruded, elongated bumper 10. Each bumper 10 has opposed axially extending slots or grooves 17, 18 which are each respectively defined by opposed axially extending lips. FIG. 2 is a side elevational view of the apparatus shown in FIG. 3 and shows an outer groove 18 in an open uncompressed state.

FIG. 3 is a sectional view of the bumper 10 before it is secured onto a furniture edge. At this state, the inside groove 17 which houses three adhesive strips 12 that are attached to and run along surfaces of said inner groove 17 is closed. The adhesive strips 12 are covered by a thin flat elongated sheet of release paper, flexible plastic film-like material adapted to be peeled off prior to attaching, (not shown) the bumper 10 to furniture. The outside groove 18 is open at this uncompressed stage. The extruded elongated bumper 10 is preferably made of polyurethane or similar resilient, nontoxic, fire retardant plastic material. The plastic material is a foamed plastic material in the preferred embodiment. This plastic may be coated to provide a smooth surface and may be provided in various aesthetically desirable colors.

Referring now to FIGS. 1 and 4–7, there is shown the elongated bumper 10 in the compressed state, wrapped around the entire perimeter of the table 11. The bumper 10 envelopes the entire edge thickness, is cut to length and the ends are butted together neatly at a butt joint 16.

Figure 4:
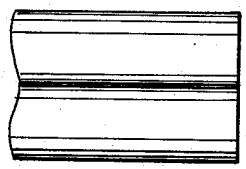
FIG. 4 is a side elevational view of the bumper when it is under compression due to attachment to a table.

FIG. 4 is a sectional view of the bumper 10 in the compressed state in which the inside groove 17 is forced open to encompass an entire furniture edge 12. When the inside groove 17 is forced open, flexible material of the bumper 10 flexes to cause the outer groove 18 to be compressed shut as shown in FIGS. 4, 5 and 6 and thus concealing a belt 13 within the outer groove 18 as well as fastener 14 joining the axial extremities of the belt 13.

Figure 5:
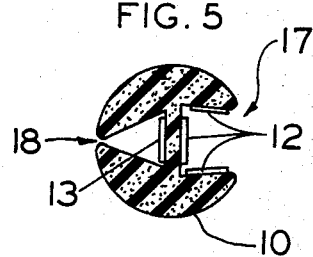
FIG. 5 is a sectional view of the bumper when it is under compression as a result of attachment to the table.

FIG. 5 is a side elevation view illustrating the outer groove 18 closed in the compressed state in which the bumper 10 is deformed into a neat cylindrical section bumper.

Figure 6:
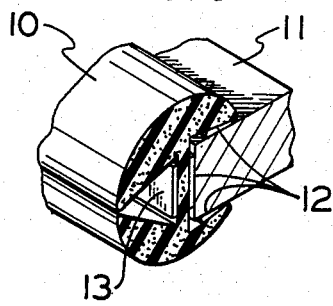
FIG. 6 is an isometric sectional view of the bumper secured to the table using both a belt and adhesive strips as means of attachment.

FIG. 6 is an isometric sectional view of the bumper 10 installed on the table 11 in which the bumper 10 encompasses the entire table edge, and in which the bumper 10 secured by means of adhesive strips 12 along the inside groove 17 which is open in this state. The belt 13 extends along the inner wall of the outer groove 18. The opening of the outer groove 18 is compressed shut in this state thereby obscuring the belt 13 from sight.

Figure 7:
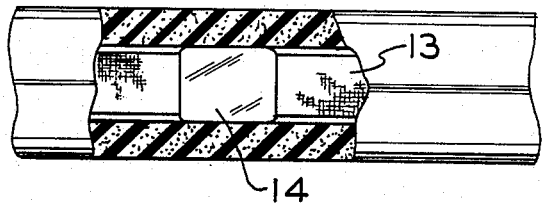
FIG. 7 is a broken away elevational view of the bumper to better illustrate a fastening device.

FIG. 7 is an elevational view of the bumper 10 with a broken away section to show a portion of the belt 13 and the fastener 14 that is otherwise hidden from sight.

Figure 8:
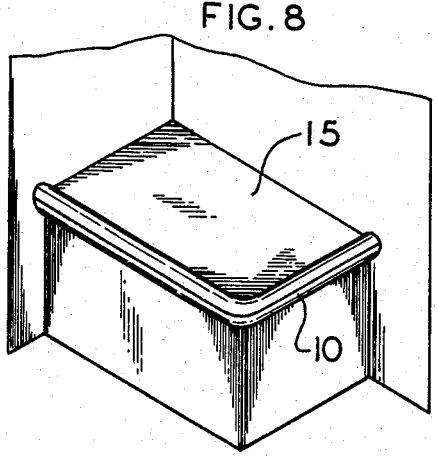
FIG. 8 is an isometric view of the bumper enclosing the entire thickness of a counter edge and attached by means of adhesive strips. The belt is not utilized in this application.

FIG. 8 is an isometric view of the bumper 10 installed on an edge of a counter 15. The edge of the counter 15 does not extend around the entire perimeter of the counter 15 and thus there is no opportunity to butt bumper 10 ends together as, for example, in FIG. 10. In this situation the belt 13 is eliminated and the bumper 10 is secured to the edge by the adhesive strips 12. This figure thus shows how the same bumper 10 may be used without the belt 13.

Figure 9:
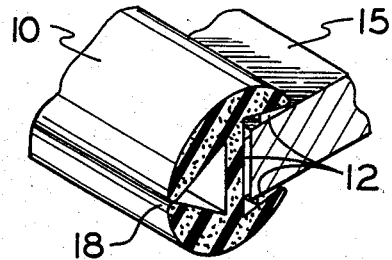
FIG. 9 is an isometric view, in partial cross section, of the bumper installed on the counter shown in FIG. 8.

Similarly, FIG. 9 is an isometric view in partial cross section of the bumper 10 as it is used on the counter 15 as is described in FIG. 8. The adhesive strips 12 secure the bumper 10 in place and illustrates the inner groove 17 compressed open, thus the outer groove 18 is compressed shut. This results in a neat cylindrical section shaped bumper 10.

While the above description contains many specifics, these should not be construed as limitations on the scope of the invention, but rather as an exemplification of one preferred embodiment thereof. Many variations are possible. Accordingly the scope of the invention should be determined not by the embodiment illustrated, but by the appended claims and their legal equivalents.

I claim:

1. A protective furniture edge guard, which comprises:

an elongated flexible bumper having a generally cylindrical section contour with opposed first and second axially extending slots defined therein, said first and second slots each being defined by opposed first and second axially extending lips, said first slot being dimensioned and configured for engagement with an associated article of furniture, said second slot being dimensioned and configured for cooperation with an associated belt, said bumper including means responsive to tightening the associated belt for closing said second slot with said lips thereof in substantially abutting relationship.

2. The guard as described in claim 1, wherein:

said guard as described in claim 1 further including adhesive strips extending along the faces of said first slot.

3. The guard as described in claim 2, wherein:

said bumper is manufactured of a plastic.

4. The guard as described in claim 3, wherein:

said plastic is a foamed plastic.

5. The guard as described in claim 4, wherein:

said plastic is polyurethane.

6. A protective furniture edge guard, which comprises:

a belt;

an elongated flexible bumper having a generally cylindrical section contour with opposed first and second axially extending slots defined therein, said first and second slots each being defined by opposed first and second axially extending lips, said first slot being dimensioned and configured for engagement with an associated article of furniture, said second slot being dimensioned and configured for cooperation with said belt, said bumper including means responsive to tightening of said belt for closing said second slot with said lips thereof in substantially abutting relationship.

7. The guard as described in claim 6, further including:

adhesive strips extending along the faces of said first slot.

8. The guard as described in claim 7, wherein:

said bumper is manufactured of a plastic.

9. The guard as escriabed in claim 8, wherein:

said plastic is a foamed plastic.

10. The guard as described in claim 9, wherein:

said plastic is polyurethane.

11. The guard as described in claim 6, wherein:

said belt is manufactured of a flexible fabric material, said guard further including means for attaching axial extremities of said belt to each other.

* * * * *